US007729077B2

United States Patent
Tiwari et al.

(10) Patent No.: US 7,729,077 B2
(45) Date of Patent: Jun. 1, 2010

(54) DISK DRIVE WRITE DRIVER AND ASSOCIATED CONTROL LOGIC CIRCUITRY

(75) Inventors: Vineet Tiwari, San Jose, CA (US); Baris Posat, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 893 days.

(21) Appl. No.: 11/512,466

(22) Filed: Aug. 30, 2006

(65) Prior Publication Data

US 2008/0055760 A1    Mar. 6, 2008

(51) Int. Cl.
G11B 5/02    (2006.01)
(52) U.S. Cl. .......................................... 360/68
(58) Field of Classification Search ................. None
See application file for complete search history.

(56) References Cited

U.S. PATENT DOCUMENTS 6,462,896 B1 * 10/2002 Codilian et al. ............... 360/48
6,545,514 B2 * 4/2003 Barrow ........................ 327/110
7,177,979 B2 * 2/2007 Kuwamura .................. 711/112
2003/0090828 A1 * 5/2003 Venca et al. .................. 360/61
2005/0152206 A1 * 7/2005 Barnett et al. ........... 365/230.06
2005/0254159 A1  11/2005 Venca et al.

* cited by examiner

*Primary Examiner*—Daniell L Negrón
(74) *Attorney, Agent, or Firm*—Lisa K. Jorgenson; Andre M. Szuwalski

(57) ABSTRACT

An H-bridge driver for a disk drive system includes first and second high side switched legs and first and second low side switched legs. An inductor head for writing data to and reading data from a magnetic media is connected to form a center of the H-bridge. The system includes a voltage regulator circuit that generates a common mode regulated voltage. First and second high side logic circuits, which selectively control operation of the first and second high side switched legs, are coupled between a high reference voltage and the common mode regulated voltage. First and second low side logic circuits, which control the first and second low side switched legs, are coupled between the common mode regulated voltage and ground.

21 Claims, 3 Drawing Sheets

DISK DRIVE WRITE DRIVER AND ASSOCIATED CONTROL LOGIC CIRCUITRY

BACKGROUND OF THE INVENTION

1. Technical Field of the Invention

The present invention relates to hard disk drive (HDD) systems and, more particularly, to a write driver and associated control logic circuitry for use in such HDD systems.

2. Description of Related Art

The demand for improved data storage techniques and systems continues to rapidly grow. Hard disk drives utilizing magneto resistive (MR) heads to read and write data onto one or more spinning magnetic platters or disks are one of the more important and wide spread devices in the data storage industry. Hard disk drives may be used in many applications, both fixed and mobile, including enterprise computer systems, personal computers, set top boxes, audio, video, or television applications, and many other large and small computer devices. Many applications are still being developed, and the uses for hard disk drives are expected to increase.

Hard disk drives store binary encoded information as regions of magnetic flux on a media having a magnetic surface coating. It is desirable that these magnetic regions be encoded on the disk as densely as practical, so that a maximum amount of information may be stored. Disk drive suppliers continue to increase areal densities, or the number of data bits per square inch, to meet the increasing demand for storage at competitive pricing. However, increasing areal density requires the write mechanism to produce smaller recorded patterns on the disk. Write head design and write driver design are key technologies needed to achieve these capacity increases.

The magnetic regions are created by passing current through a coil of a magnetic write head. Binary data can be encoded by switching the polarity of the current through a coil in the write head. The current in the write head coil is provided by a circuit in a write driver that is connected to the coil through a flexible transmission interconnect. The data rate (i.e., the rate at which bits can be written onto the media) is determined largely by the rate at which the current can be switched in the write head driver circuit. It is desirable to have a write driver circuit that quickly switches current to the desired polarity and magnitude to support high disk rotation speeds with small magnetic regions. Also, the driver circuit must raise the current amplitude to a level sufficient to ensure the flux generated by the write coil is adequate to saturate the magnetic media while limiting the current below levels that will result in "blooming" of the written magnetic region into adjacent regions of the media.

A conventional write driver circuit comprises an H-bridge configuration using four switches. In an H-bridge circuit, one leg of the bridge is always trying to drive current into the inductive load of the write head. In other words, the H-bridge is always coupling the power supply voltage onto one of the inductor nodes and ground to the other inductor node by appropriately activating the bridge switches. There are continuing issues with respect to the power required to operate or drive the write head with the write driver, and specifically, there is an increasing demand for power reduction as the disk drives are utilized in mobile applications.

FIG. 1 illustrates in simplified form a hard disk drive system 300 that utilizes a write head 328 linked via an interconnect 340 to a write driver 330. As shown, disk drive system 300 includes a system processor 313 processing requests and commands from a host computer 301 that directs drive system 300 to perform specific behavior involving the disk drive assembly 320. Examples of such behavior include reading and writing data to disk drive assembly 320, providing state information such as defect tables, error status, and the like. Disk controller unit 303 includes data processing capacity as well as memory in the form of ROM 312 and buffer memory 304 to generate responses to received commands and requests as controlled by memory control 309. The generated responses return data, state information, and/or error codes depending on the particular operation being performed.

Disk drive system 300 implements physical mass storage typically on a plurality of magnetic disks and uses read/write head electronics for transferring data with respect to the disks. As shown, disk drive system 300 includes read channel hardware 305/314 for preprocessing and amplifying data read from the magnetic media as well as a spindle motor 324 for spinning the disks, and voice coil motor (VCM) 322 for positioning the read/write head electronics at specific locations with respect to the disk surface(s). Servo control 308 generates drive signals that control the VCM 322 and/or spindle motor 324. These drive signals are in the form of precision higher power signals that drive the motors directly.

Host 301 typically comprises a data processing device such as a personal computer, server, workstation or the like that requires access to bulk data storage capabilities of disk drive assembly 320. Host 301 sends write commands and data via controller 303 to write data onto the disk(s) 326 as well as read commands to retrieve previously written data from disks within disk drive assembly 320. The read and write commands are provided via the read/write channel 305. On both read and write operations, the data transmitted from the host 301 to the disk controller 303 includes an indication of a specific location or set of locations on the disk drive assembly 320 that contains the data that is to be accessed.

The data that is exchanged through disk controller 303 is typically buffered in buffer memory 304 that is accessible via memory controller 309 and subsequently transmitted to disk assembly 320 or host 301. Buffer memory 304 is used to overcome differences between the speed at which host 301 operates as compared to the speed at which disk assembly 320 operates. In place of or in addition to buffer memory 304, a cache memory may be implemented by appropriate changes (e.g., tag management, hit/miss detection, and the like) to memory controller 309. Servo control 308 regulates the spin speed of spindle motor 324 in response to commands from system processor 313. Although a head position control unit is often provided, the servo control 308 is shown to operate, e.g., through a voltage mode driver (not shown), to deliver controlled voltage signals in response to commands from system processor 313 to voice coil motor 322. These voltage signals cause voice coil motor unit 322 to move read/write head 328 into precision alignment with respect to the surfaces of disk 326.

Read/write channel circuit 305 communicates data and control information with the surface of disk 326. Control information such as servo control data, phase lock oscillator synchronization patterns, and servo bursts are encoded into portions of disk 326. This information is provided through read/write channel circuit 305 to system processor 313. System processor 313 uses this information to compute commands for servo control 308.

The read/write head 328 comprises an MR head that is used to both record user data to and read user data back from the disk 326. Recording data or writing by the head 328 is controlled in part by the write driver 330 that functions to drive a current through a coil in the head. In this regard, the write driver 330 of the system 300 is configured according to the invention to include a voltage boosting circuit 338 that launches an output voltage into the interconnect 340 and a pulsed current is transmitted over a transmission line of interconnect 340 to the head 328. To control propagation of reflected waves from the head 328, the write driver 334 also is shown to include an impedance matching circuit 334 which illustrates the concept of matching the impedance of the write driver 330 to the impedance of the interconnect 340. In practice, the circuit 334 may be one or more components, such as an output resistor of the driver 330, with the important aspect being that the write driver 330 includes one or more components that set the write driver 330 output impedance to the odd characteristic impedance of the interconnect 340.

The voltage boosting circuit 338 and other circuitry of the write driver 330 operate to provide a certain output voltage swing for the driver 330 so as to achieve a desired output step current in the head 328. The output voltage of the driver 330 is supplied to the interconnect 340 for a typical two-directional or switched write driver implementation.

Operation and configuration of the system as illustrated in FIG. 1 is more particularly described in U.S. application for patent, Ser. No. 10/843,823, filed May 12, 2004 and published as United States Patent Application Publication No. 2005/0254159 on Nov. 17, 2005, the disclosure of which is hereby incorporated by reference.

Reference is now made to FIG. 2 wherein there is shown a block diagram of hard disk drive system write driver and associated control logic in accordance with the prior art. In the past, data writing circuits and/or write drive circuits used to supply write signals to the heads of disk drive systems included preamplifier circuits to drive the current through selected legs of an "H-bridge" circuit, which is capable of allowing relatively fast current reversals for accurate data reproduction.

An example of a typical H-bridge write head drive circuit 10 is shown in FIG. 2. The circuit 10 includes four switched driver circuits 12-15 (Driver_XUP, Driver_XDOWN, Driver_YUP, Driver_YDOWN) in four corresponding legs that are connected between a high reference voltage Vcc5 (5 Volts) and a low reference voltage Vgnd (ground). An MR write (inductor) head 19 includes a coil (inductance) used, for example, to supply data pulses for writing to a disk drive media. The coil of the write head 19 is connected between the center legs of the H-bridge, as shown.

It can been seen that, depending on selective activation of the driver circuits 12-15, the current flows through the coil of the write head 19 in one direction or another. That is, one current flow path includes the leg with the driver circuit Driver_YUP 14, the coil of the write head 19 from right to left, and the leg with the driver circuit Driver_XDOWN 13. The other current flow path includes the leg with the driver circuit Driver_XUP 12, the coil of the write head 19 from left to right, and the leg with the driver circuit Driver_YDOWN 15.

In the H-bridge circuit 10, the (pull up) driver circuits 12 and 14 serve as switching circuits, which are controlled by control signals received on a pair of respective input lines or buses 28 and 29. The (pull down) driver circuits 13 and 15 serve as current controlling circuits, which are controlled by control signals received on a pair of respective input lines of buses 30 and 31. The control signals supplied to the control input lines 28-31 are generated by control logic circuits 32-35 (Logic_XUP, Logic_XDOWN, Logic_YUP, Logic_YDOWN).

Because the write driver circuits 12-15 are differential circuits connected between supply rails (Vcc5 and Vgnd), at any time one side of the write head 19 is driven by positive supply (Vcc5) while the other side of the write head 19 is driven by negative supply (Vgnd). When the write data flips, the sides of the write head 19 driven by positive/negative supply also flip.

In conventional construction the positive supply rail (Vcc5) is set at 5 Volts with the negative supply rail (Vgnd) at 0 Volts. Thus, the driver operates over a voltage range of 0-5 Volts. Such is not, however, the case with respect to the control logic circuits 32-35. Conventionally, the control logic circuits 32-35 are bicmos process circuits supporting a maximum voltage range as allowed by the included pmos and nmos transistors of about 0-3.3 Volts. The difference in operating voltage ranges between the driver circuits 12-15 and the control logic circuits 32-35 presents a supply voltage challenge for the driver system 10 especially with respect to the operation of the control logic circuits 32-35. To address this challenge, the prior art teaches the use of two voltage regulator circuits.

A first voltage regulator circuit 51 (Reg_UP) receives power from the positive supply rail (Vcc5) set at 5 Volts and generates a first regulated voltage Vreg_up at 1.7 Volts. In this case 1.7 Volts is chosen as the first regulated voltage output because 5 Volts minus 3.3 Volts is 1.7 Volts. The first regulated voltage Vreg_up is supplied to the control logic circuits Logic_XUP 32 and Logic_YUP 34, which also receive Vcc5, to ensure that these bicmos circuits operate only over the 3.3 Volt range in generating the control signals applied to the driver circuits Driver_XUP 12 and Driver_YUP 14. Thus, as shown in FIG. 3, the switching current Iswitch_up in the control logic circuit Logic_XUP 32 (or Logic_YUP 34 for the flipped operation) is sourced by Vcc5 and sunk to Vgnd through the regulator 51 but flows in the logic circuit only between 5 Volts and 1.7 Volts (i.e., no greater than 3.3 Volts).

A second voltage regulator circuit 52 (Reg_DOWN) receives power from the positive supply rail (Vcc5) set at 5 Volts and generates a second regulated voltage Vreg_down at 3.3 Volts. In this case 3.3 Volts is chosen as the second regulated voltage output because 0 Volts plus 3.3 Volts is 3.3 Volts. The second regulated voltage Vreg_down is supplied to the control logic circuits Logic_XDOWN 33 and Logic_YDOWN 35, which also receive Vgnd, to ensure that these bicmos circuits operate only over the 3.3 Volt range in generating the control signals applied to the driver circuits Driver_XDOWN 13 and Driver_YDOWN 15. Thus, as shown in FIG. 3, the switching current Iswitch_down in the control logic circuit Logic_YDOWN 35 (or Logic_XDOWN for the flipped operation) is sunk to Vgnd and sourced by Vcc5 through the regulator 52 but flows in the logic circuit only between 3.3 Volts and 0 Volts (i.e., no greater than 3.3 Volts).

While the foregoing solution provides acceptable performance in most instances, it has been noted that the driver, given that the two currents Iswitch_up and Iswitch_down are both active during write, can consume a significant amount of power and generate significant heat during operation. In a mobile environment, this is unacceptable. A need accordingly exists for a driver and logic circuit configuration having improved operation with respect to power consumed and heat generated without sacrificing circuit performance.

SUMMARY OF THE INVENTION

In accordance with an embodiment of the invention, a circuit comprises an H-bridge driver including four switched legs, the driver being coupled between a high reference voltage and ground. A control logic circuit, also coupled between the high reference voltage and ground, is operable to selectively actuate the four switched legs of the H-bridge driver. A voltage regulator circuit, also coupled between the high reference voltage and ground, is operable to generate a common mode regulated voltage that is supplied as a reference voltage to the control logic circuit.

In accordance with another embodiment, a circuit comprises an H-bridge driver including first and second high side switched legs and first and second low side switched legs. First and second high side logic circuits control the first and second high side switched legs, and first and second low side logic circuits control the first and second low side switched legs. A voltage regulator circuit generates a common mode regulated voltage that is supplied as a reference voltage applied between the high side and low side logic circuits.

In accordance with another embodiment, a circuit comprises an H-bridge driver including first and second high side switched legs and first and second low side switched legs. A voltage regulator circuit generates a common mode regulated voltage. First and second high side logic circuits, for controlling the first and second high side switched legs, are coupled between a high reference voltage and the common mode regulated voltage, and first and second low side logic circuits, for controlling the first and second low side switched legs, are coupled between the common mode regulated voltage and ground.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 4:
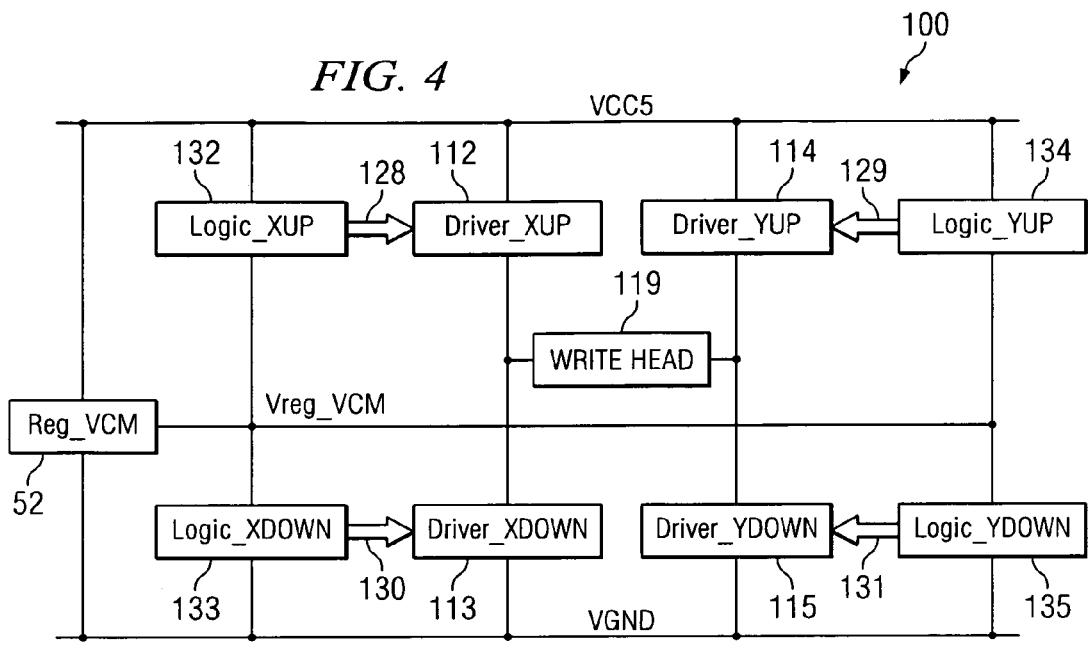
FIG. 4 is a block diagram of hard disk drive system write driver and associated control logic in accordance with an embodiment of the present invention.

Reference is now made to FIG. 4 wherein there is shown a block diagram of a hard disk drive system 100 write driver and associated control logic in accordance with an embodiment of the present invention.

The circuit 100 includes, with respect to an H-bridge configuration, four switched driver circuits 112-115 (Driver_XUP, Driver_XDOWN, Driver_YUP, Driver_YDOWN) connected between a high reference voltage Vcc5 (5 Volts) and a low reference voltage Vgnd (ground). An MR write (inductor) head 119 includes a coil (inductance) used, for example, to supply data pulses for writing to a disk drive media. The coil of the write head 119 is connected between the center legs of the H-bridge, as shown.

It can been seen that, depending on selective activation of the switched driver circuits 112-115, the current flows through the coil of the write head 119 in one direction or another. That is, one current flow path includes one high side leg with the driver circuit Driver_YUP 114, the coil of the write head 119 from right to left, and another low side leg with driver circuit Driver_XDOWN 113. The other current flow path includes one high side leg with driver circuit Driver_XUP 112, the coil of the write head 119 from left to right, and one low side leg with the driver circuit Driver_YDOWN 115.

In the circuit 100, the (pull up high side) driver circuits 112 and 114 serve as switching circuits, which are controlled by control signals received on a pair of respective input lines or buses 128 and 129. The (pull down low side) driver circuits 113 and 115 serve as current controlling circuits, which are controlled by control signals received on a pair of respective input lines or buses 130 and 131. The control signals, for effectuating controlled switching of the legs of the H-bridge, are supplied to the control input lines 128-131 by corresponding high/low side control logic circuits 132-135 (Logic_XUP, Logic_XDOWN, Logic_YUP, Logic_YDOWN).

Because the write driver circuits 112-115 are differential circuits connected between supply rails (Vcc5 and Vgnd), at any time one side of the write head 119 is driven by positive supply (Vcc5) while the other side of the write head 119 is driven by negative supply (Vgnd). When the write data flips, the sides of the write head 119 driven by positive/negative supply also flip.

As with the conventional construction described above, the positive supply rail (Vcc5) is set at 5 Volts with the negative supply rail (Vgnd) at 0 Volts. Thus, the driver operates over a voltage range of 0-5 Volts. The control logic circuits 132-135, however, are bicmos process circuits supporting a maximum voltage range as allowed by the included pmos and nmos transistors of about 0-3.3 Volts. In the embodiment illustrated in FIG. 4, the control logic circuits 32-35 are supplied for operation with less voltage range than they can actually handle (i.e., less than the 3.3 Volts maximum described above). This is accomplished by using a single common mode voltage regulator (Reg_VCM) 151 connected between the positive supply rail (Vcc5) set at 5 Volts and the negative supply rail (Vgnd) at 0 Volts. The common mode voltage Vreg_VCM output from the regulator 151 is accordingly Vcc/2 (or in this specific, but not limiting, case, a voltage of 2.5 Volts). This common mode output voltage from the regulator 151 is supplied as a reference voltage not only to the high side control logic circuits Logic_XUP 132 and Logic_YUP 134, but is also supplied as a reference voltage to the low side control logic circuits Logic_XDOWN 133 and Logic_YDOWN 135. The high side control logic circuits Logic_XUP 132 and Logic_YUP 134, which also receive Vcc5, thus operate only over the reduced Vcc/2 (i.e., 2.5 Volt) range in generating the control signals applied to the high side driver circuits Driver_XUP 112 and Driver_YUP 114. More specifically, these circuits operate over the voltage range between 5 Volts and 2.5 Volts. Likewise, the low side control logic circuits Logic_XDOWN 133 and Logic_YDOWN 135, which also receive Vgnd, thus operate only over the reduced Vcc/2 (i.e., 2.5 Volt) range in generating the control signals applied to the low side driver circuits Driver_XDOWN 113 and Driver_YDOWN 115. More specifically, these circuits operate over the voltage range between 2.5 Volts and 0 Volts. Because the control logic circuits operate over the reduced voltage range (of 2.5 Volts), all of the driver circuits must be designed with slightly larger transistor devices (than those used in the circuit of FIG. 2) in order to adequately drive the signals on lines/buses 128-131. Such a design is well within the capabilities of one skilled in the art.

The common mode regulator 151 can be a push-pull type circuit, as is known to those skilled in the art, which can source or sink current equally well.

Figure 3:
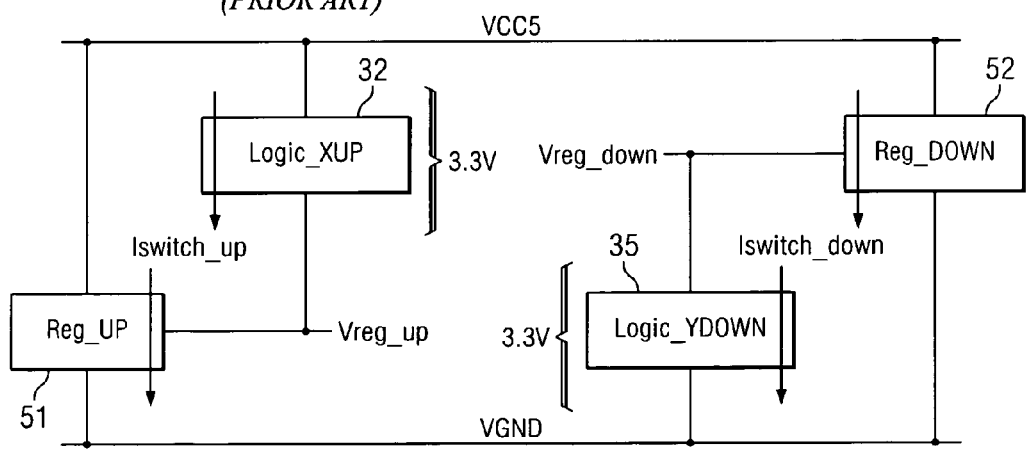
FIG. 3 is a block diagram illustrating control logic current flow in the circuit of FIG. 2.
Figure 5:
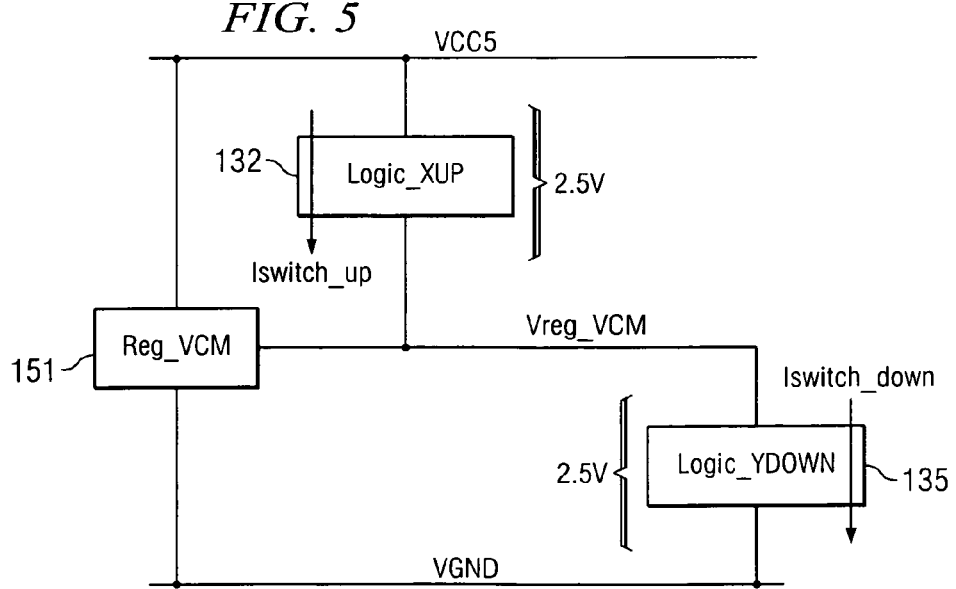
FIG. 5 is a block diagram illustrating control logic current flow in the circuit of FIG. 4.

Thus, as shown in FIG. 5, the switching current Iswitch_up in the high side control logic circuit Logic_XUP 132 (or Logic_YUP 134 for the flipped operation) is sourced by Vcc5 and flows in that logic circuit only between 5 Volts and 2.5 Volts (i.e., less than the bicmos maximum of about 3.3 Volts), and the switching current Iswitch_down in the low side control logic circuit Logic_YDOWN 135 (or Logic_XDOWN 133 for the flipped operation) is sunk to Vgnd and flows in that logic circuit only between 2.5 Volts and 0 Volts (i.e., less than the bicmos maximum of about 3.3 Volts). What is of some importance to note in connection with FIG. 5 is that the high side logic_UP circuit (132/134) on one side of the driver and the low side logic_DOWN circuit (133/135) on the other side of the driver will be working with each other. In this regard, in FIG. 5 the switching current Iswitch_up in the logic_UP circuit (132/134) on one side of the driver is reused as the switching current Iswitch_down in the logic_DOWN circuit (133/135) on the other side of the driver. This configuration and operation is quite different from the two separate currents used in the prior art circuit as is shown in FIG. 3 and this assists in providing for improved power and heat operation.

Figure 1:
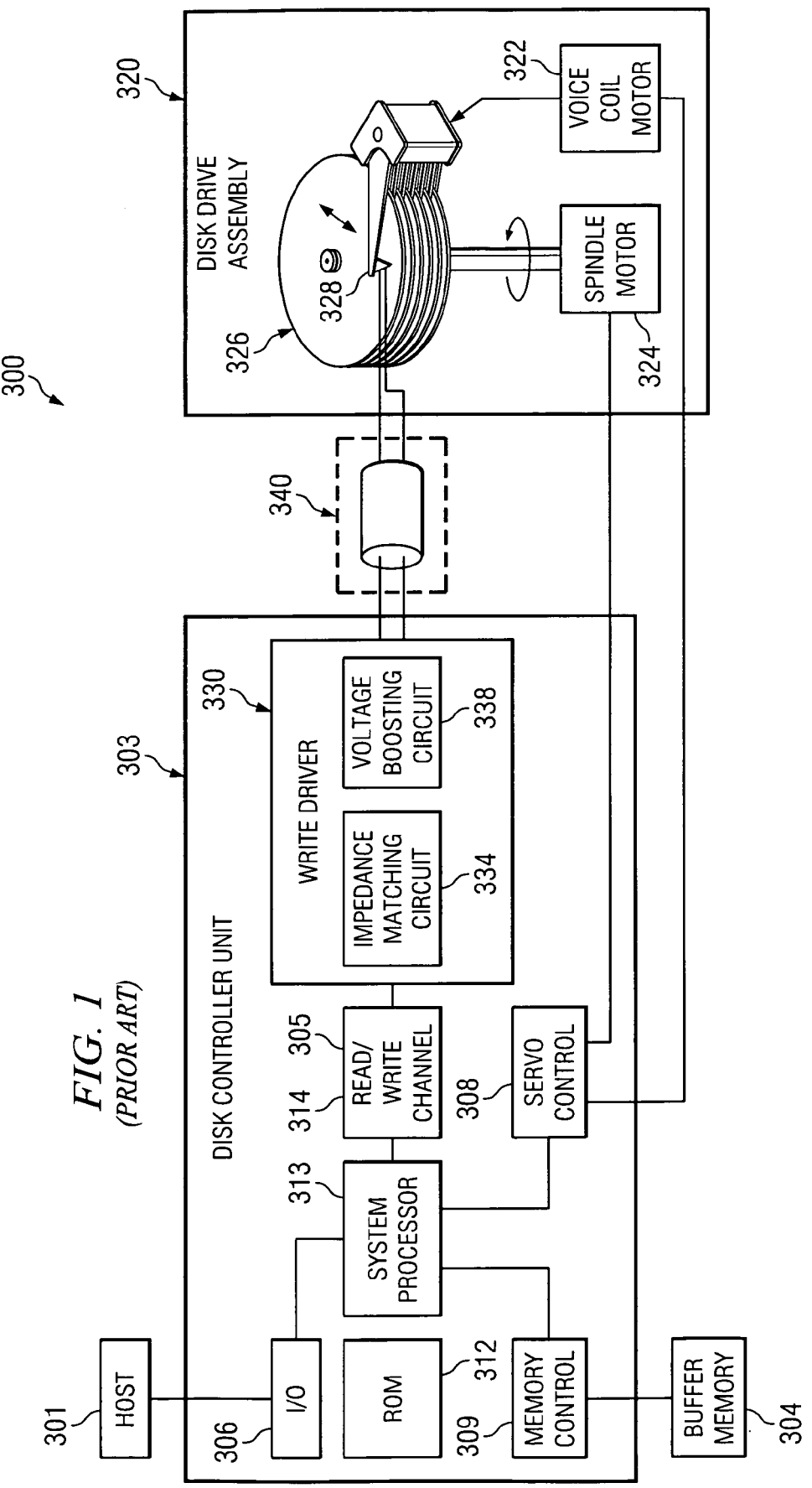
FIG. 1 illustrates in simplified form a hard disk drive system of the prior art.
Figure 2:
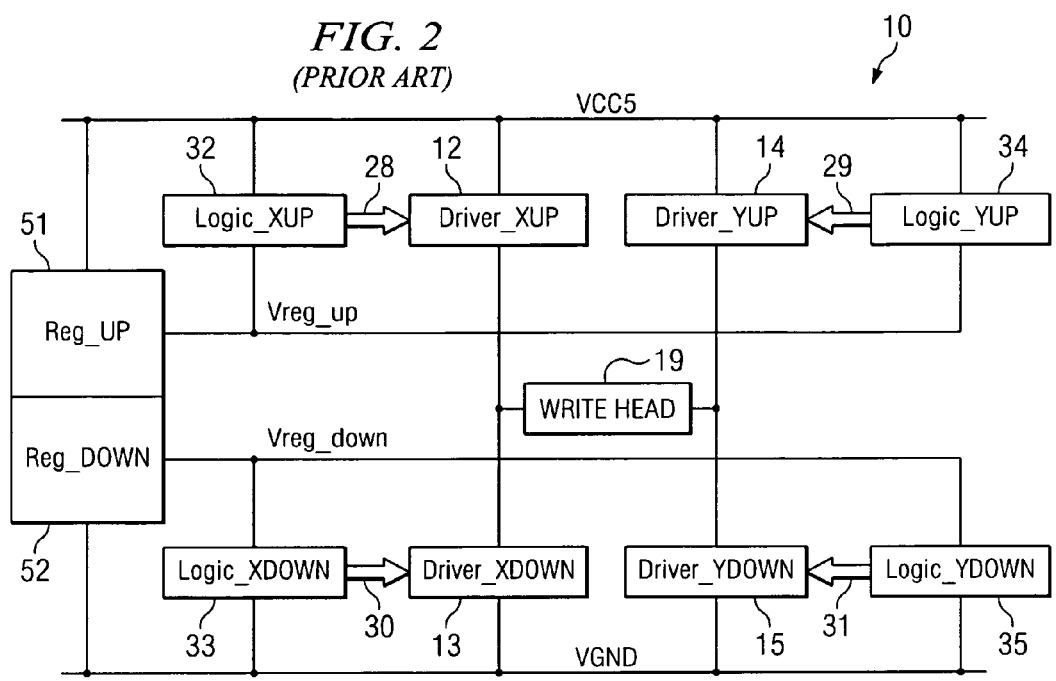
FIG. 2 is a block diagram of hard disk drive system write driver and associated control logic in accordance with the prior art.

By combining Vreg_up and Vreg_down from the prior art circuit shown in FIG. 2 into a single common mode voltage regulator 151 as shown in FIG. 4, a significant power savings can be achieved. Simulation results demonstrate that power savings of up to 15-20% can be achieved, in comparison to the prior art circuit of FIG. 2, by using the common mode regulator implementation of FIG. 4. This makes the circuit design of FIG. 4 especially attractive for use in mobile applications such as the preamplifier integrated circuits used in mobile disk drive systems. The reduction in power further results in a reduction in heat. Additionally, some savings in integrated circuit area can be achieved through the elimination of the second voltage regulator which is required in the circuit of FIG. 2.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A circuit, comprising:
   an H-bridge driver including four switched legs, the driver being coupled between a high reference voltage node and a ground node;
   a control logic circuit also coupled between the high reference voltage node and ground node, the control logic circuit adapted to selectively actuate the four switched legs of the H-bridge driver; and
   a voltage regulator circuit also coupled between the high reference voltage node and ground node, the voltage regulator circuit adapted to generate a regulated common mode voltage that is supplied as a reference voltage to the control logic circuit.

2. The circuit of claim 1 wherein the voltage regulator circuit is a push-pull type circuit.

3. The circuit of claim 1 wherein the control logic circuit comprises a first and second high side logic circuits coupled to control the first and second high side switched legs, respectively, and further comprises first and second low side logic circuits coupled to control the first and second low side switched legs, respectively.

4. The circuit of claim 3 wherein the first and second high side logic circuits are coupled for receiving operating supply voltage between the high reference voltage node and the regulated common mode voltage and wherein the first and second low side logic circuits are coupled for receiving operating supply voltage between the regulated common mode voltage and the ground node.

5. The circuit of claim 3 wherein the control logic circuit has a certain maximum process voltage range for operation which is less than a voltage range between the high reference voltage node and ground node and wherein the high side and low side logic circuits operate over a voltage range which is less than the certain maximum process voltage range due to the regulated common mode voltage that is supplied to the control logic circuit.

6. The circuit of claim 1:
   wherein the four switched legs comprise first and second high side switched legs and first and second low side switched legs; and
   wherein the control logic circuit comprises first and second high side logic circuits coupled to control the first and second high side switched legs and first and second low side logic circuits coupled to control the first and second low side switched legs; and
   wherein the regulated common mode voltage is applied as a lower reference supply voltage for the high side logic circuits and applied as an upper reference supply voltage for the low side logic circuits.

7. The circuit of claim 1 further comprising an inductor head for writing data to and reading data from a magnetic media, the inductor head being connected to form a center of the H-bridge.

8. A circuit, comprising:
   an H-bridge driver including first and second high side switched legs and first and second low side switched legs;
   first and second high side logic circuits for controlling the first and second high side switched legs;
   first and second low side logic circuits for controlling the first and second low side switched legs;
   a voltage regulator circuit that generates a regulated common mode voltage that is supplied as a reference voltage applied as a lower reference supply voltage for the high side logic circuits and applied as an upper reference supply voltage for the low side logic circuits.

9. The circuit of claim 8 wherein the voltage regulator circuit is a push-pull type circuit.

10. The circuit of claim 8 further comprising an inductor head for writing data to and reading data from a magnetic media, the inductor head being connected to form a center of the H-bridge.

11. The circuit of claim 8 wherein the first and second high side logic circuits are coupled for receiving operating supply voltage between a high reference voltage node and the regulated common mode voltage and wherein the first and second low side logic circuits are coupled between the regulated common mode voltage and a ground node.

12. The circuit of claim 11 wherein the high reference voltage node is adapted to receive a high supply voltage of about 5 Volts and the regulated common mode voltage is about 2.5 Volts.

13. The circuit of claim 12 wherein the high side and low side logic circuits are bicmos circuits.

14. The circuit of claim 11 wherein the high side and low side logic circuits have a certain maximum process voltage range for operation which is less than a voltage range between the high reference voltage node and ground node and wherein the high side and low side logic circuits operate over a voltage range which is less than the certain maximum process voltage range due to the applied regulated common mode voltage.

15. A circuit, comprising:
- an H-bridge driver including first and second high side switched legs and first and second low side switched legs;
- a voltage regulator circuit adapted to generate a regulated common mode voltage;
- first and second high side logic circuits, adapted to control the first and second high side switched legs, that are coupled for receiving operating supply voltage between a high reference voltage node and the regulated common mode voltage; and
- first and second low side logic circuits, adapted to control the first and second low side switched legs, that are coupled for receiving operating supply voltage between the regulated common mode voltage and a ground node.

16. The circuit of claim 15 wherein the voltage regulator circuit is a push-pull type circuit.

17. The circuit of claim 15 further comprising an inductor head for writing data to and reading data from a magnetic media, the inductor head being connected to form a center of the H-bridge.

18. The circuit of claim 15 wherein the high reference voltage node is adapted to receive a high supply voltage of about 5 Volts and the regulated common mode voltage is about 2.5 Volts.

19. The circuit of claim 18 wherein the high side and low side logic circuits are bicmos circuits.

20. The circuit of claim 15 wherein the high side and low side logic circuits have a certain maximum process voltage range for operation which is less than a voltage range between the high reference voltage node and ground node and wherein the high side and low side logic circuits operate over a voltage range which is less than the certain maximum process voltage range due to the applied regulated common mode voltage.

21. A circuit, comprising:
- a voltage regulator circuit coupled between a first supply node and a second supply node and adapted to generate a regulated voltage output at a third supply node, the regulated voltage being between voltages received at the first supply node and the second supply node;
- an H-bridge driver coupled between the first supply node and the second supply node, the H-bridge driver including high side switched legs connected to the first supply node and low side switched legs connected to the second supply node;
- a high side control circuit coupled between the first supply node and the third supply node, said high side control circuit powered by a first voltage equal to a difference between the voltage at the first supply node and the regulated voltage at the third supply node, said high side control circuit adapted to generate signals controlling the high side switched legs; and
- a low side control circuit coupled between the third supply node and the second supply node, said low side control circuit powered by a second voltage equal to a difference between the regulated voltage at the third supply node and the voltage at the second supply node, said low side control circuit adapted to generate signals controlling the low side switched legs.

\* \* \* \* \*